Feb. 2, 1926.
S. B. HASELTINE
1,571,898
FRICTION SHOCK ABSORBING MECHANISM
Filed Feb. 8, 1923   2 Sheets-Sheet 2
REISSUED AS NO. 16911 MARCH 20 1928
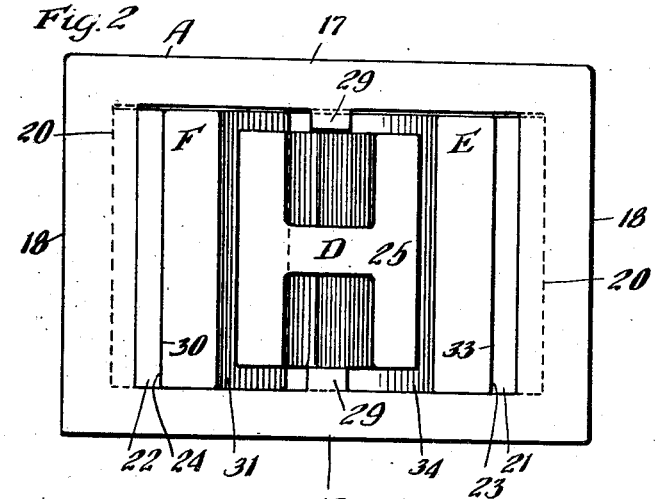
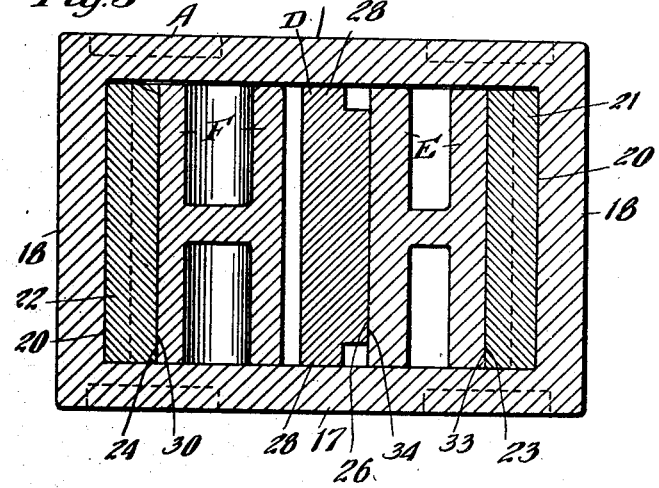
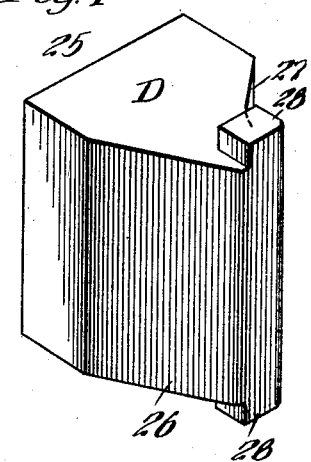
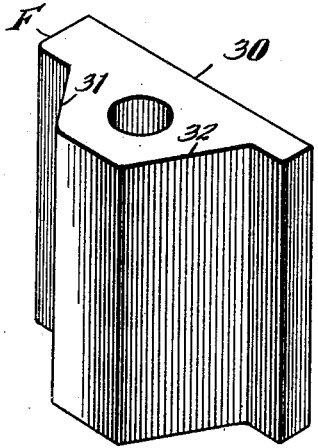
Witnesses
Wm. Geiger
Inventor
Stacy B. Haseltine
By George I. Haight
His Atty.

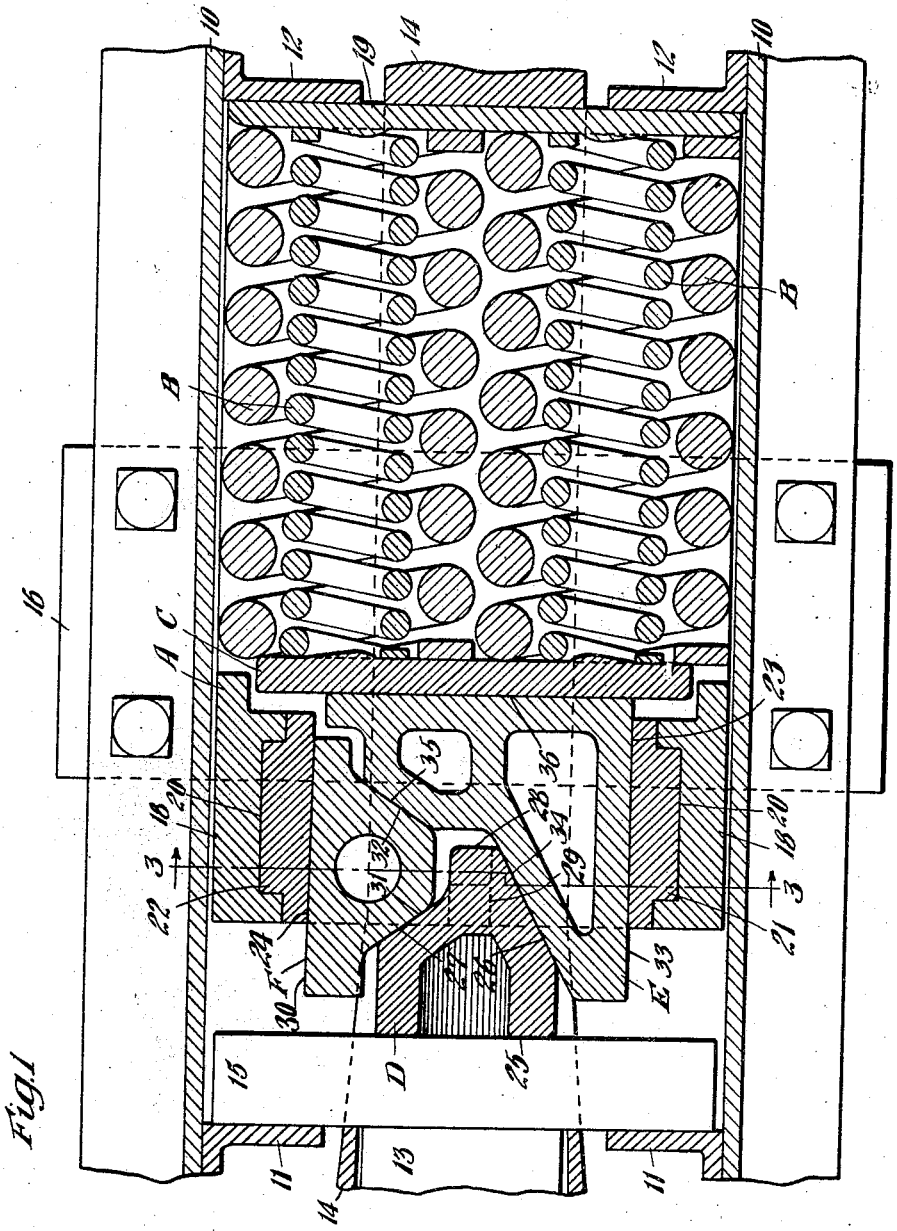

Patented Feb. 2, 1926.

1,571,898

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed February 8, 1923. Serial No. 617,678.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

A general object of the invention is to provide a friction shock absorbing mechanism, especially adapted for railway draft riggings, wherein are obtained high capacity and easy release with the employment of relatively few friction elements, each of economical and rugged construction.

Another object of the invention is to provide a friction mechanism of the character indicated, wherein the high capacity is obtained by means of a series of friction elements having a keen wedging angle effect during compression, said elements being so formed and related that, in release, the effect of a relatively blunt angle is obtained.

A more specific object of the invention is to provide, in a mechanism of the character indicated, a friction unit consisting of a plurality of elements, each having inclined face engagement with the remaining elements of the unit, the unit being so designed that the element to which the actuating force is applied initially, tends to spread or expand the unit transverse to the line of the applied force, this tendency, however, being overcome or overbalanced by a creative force acting transversely and operative to expand or spread the unit longitudinally, or in the direction of the applied forces, to the end of creating high frictional resistance between the unit and cooperating confining member.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Figure 2 is a front end elevation of the shock absorbing mechanism proper. Figure 3 is a vertical transverse sectional view of the shock absorbing mechanism proper corresponding to the line 3—3 of Figure 1. And Figures 4 and 5 are detail perspectives of the pressure receiving element and one of the friction-shoes, respectively.

In said drawings, 10—10 denote the usual draft sills of a car underframe to the inner faces of which are secured front stop lugs 11 and rear stop lugs 12. A portion of a draw bar is indicated at 13, the same being operatively associated with the shock absorbing mechanism proper by a hooded cast yoke 14 within which said mechanism is disposed and also a front follower 15. The yoke and parts therewithin are supported in operative position by a detachable saddle plate 16.

The improved shock absorbing mechanism proper, as shown, comprises, broadly, a combined friction shell and spring cage casting A; twin arranged springs B—B; a spring follower C; a pressure-receiving wedge element D; and two friction-shoes E and F.

The casting A, as shown, is formed with top and bottom walls 17—17, side walls 18—18 and rear wall 19, all integrally formed. The side walls 18 are made relatively short so as to leave the major portion of the sides of the casting A open to admit of the insertion and removal of certain of the parts. The inner faces of the side walls 18 are recessed as indicated at 20 to thereby detachably accommodate heavy wear resisting plates or liners 21 and 22. The liner 21 is formed on its inner face with a longitudinally extending friction surface 23 which extends parallel to the center line of draft. The other liner 22 is formed on its inner face with an opposing friction surface 24 which is inclined at a relatively acute angle with respect to the center line of the mechanism, thus making the opposed friction surfaces 23 and 24 relatively converged inwardly of the shell.

The pressure-receiving wedge element D is preferably in the form of a cored cast block having a front or outer flat bearing surface 25 which bears against the inner face of the follower 15. Said element D is also provided with a wedge face 26 extending at a relatively acute angle with respect to the axis of the mechanism. The element D is also provided on the side opposite to the wedge face 26 with another inclined face 27 extending at a relatively blunt angle with respect to the axis of the mechanism. On its top and bottom faces, at its inner end, the element D is provided with lugs 28—28 which are adapted to cooperate with opposed oppositely extending lugs or shoulders 29—29 formed on the inner faces of the top and bottom walls 17 to limit the outward movement of the element D with respect to the casting A and thereby maintain the overall length of the mechanism.

The wedge friction-shoe element F, also preferably in the form of a cored casting, is provided on its outer side with a flat friction surface 30 extending at the same angle as and cooperable with the shell friction surface 24. On its inner side, that is, the side nearest the axis of the mechanism, the element F is formed with a lateral enlargement on the front side of which is provided an inclined face 31 cooperable with the inclined face 27 of the wedge element D. On the rear side of said enlargement another face 32 is provided, said faces 31 and 32 making the same angle with the center line of the mechanism, but extending in opposite directions, thereby presenting a wedge operable laterally of the shell.

The wedge-friction-shoe element E, also preferably in the form of a cored casting, is formed on its outer side with a longitudinally extending flat friction surface 33 parallel to the center line of the mechanism and cooperable with the corresponding shell friction surface 23. The element E is also provided with an inclined wedge face 34 extending at the same angle as and cooperable with the wedge face 26 disposed at one side of the center line of the mechanism and with an additional inclined face 35 on the other side of the center line of the mechanism, said face 35 extending at the same angle as and cooperable with the face 32 of the element F. On its inner end, the element E is provided with a transversely extending flat face 36 bearing on the front side of the spring follower C. The latter is interposed between the element E and the twin arranged springs B and it will be seen that the follower C is normally separated from the inner ends of the liners 21 and 22, and walls 18 of the friction shell.

The operation is as follows, assuming an inward or buffing movement of the draw bar. As pressure is applied to the element D, the initial tendency is for the latter to slip or move inwardly of the shell with respect to the keen angle shoe E on the two cooperating wedge faces 26 and 34, it being evident that this tendency is in a manner to spread the friction unit consisting of the three elements, laterally. As the three elements cooperating as a unit move inwardly of the shell, the shoe F travels along the inclined shell surface 24, thereby inducing a lateral inward movement of said element F with respect to the two remaining elements D and E. This lateral movement of the element F, produces a separating wedge action between the two elements D and E, thereby slightly elongating the unit in the direction of the applied force and creating a very high resistance between the unit and the shell, it, of course, being understood that yielding resistance is afforded the entire unit by the springs B—B. In this connection, it will be observed that the sets of inclined faces 27 and 31, and 32 and 35, on account of their relative blunt angularity with respect to the center line of the mechanism or the line of applied force, will readily accommodate the action above described and will act somewhat in the manner of safety valves to prevent bursting of the shell while the high frictional resistance is still maintained. Ample clearance is left between the various elements to provide for the action described. Upon discontinuance of the actuating force, the pressure wedge element D will readily release itself with respect to the elements F and E on account of the relatively blunt angle of the cooperating faces 27 and 31 and also on account of the obtuse or blunt included angle between the wedge face 34 and inclined face 31 of the two shoes. This loosening of the pressure wedge element D with respect to the shoes, in turn serves to permit collapse of the entire unit which may then be projected outwardly by the reaction of the springs. The relative taper or convergence of the shell friction surfaces also facilitates the restoration of the parts to normal position during the release action, as will be understood by those skilled in the art. Wear on the cooperating sets of surfaces will automatically be compensated for by a slight gradual outward working of the two shoes E and F, the overall length of the mechanism being maintained constant by the wedge element D in cooperation with the shell, as heretofore explained, and in this connection it will be understood that the springs B are preferably initially placed under preliminary compression to allow for a slight expansion as wear takes place.

From the preceding description, taken in connection with the drawings, it will be seen that all of the friction elements are of simple, rugged and economical design. By varying the angle of the different sets of cooperating inclined faces, the desired amount of capacity may be obtained and release always insured.

Although I have herein shown and described what I now consider the preferred manner of carrying out the invention, the same is by way of illustration only, as I am aware that many changes and modifications may be made without departing from the scope of the following claims.

I claim:

1. In a friction shock absorbing mechanism, the combination with a friction shell having interior opposed friction surfaces relatively converged inwardly of the shell; of a spring resistance; and a friction unit within and cooperable with said shell, said unit comprising a plurality of elements each having engagement with the remaining elements of the unit on faces inclined to the line of the actuating force, the element initially receiving the actuating force tending to expand the unit transverse to the line of the actuating force, and one of the remaining elements operating to overbalance said tendency and expanding the unit in the direction of the applied force during a compression stroke.

2. In a friction shock absorbing mechanism, the combination with a main follower; of a friction shell having interior opposed friction surfaces extending in the general direction of the actuating force; a spring resistance; and a friction unit within and cooperable with said shell, said unit comprising, a pressure-receiving wedge element engaging the main follower, and two friction-shoes with each of which said wedge element has engagement on faces inclined to the line of the applied force, said shoes having also engagement with each other on faces inclined to the line of the applied force.

3. In a friction shock absorbing mechanism, the combination with a friction shell having interior opposed friction surfaces extending in the general direction of the actuating force; of a spring resistance; pressure-transmitting member and a friction unit within and cooperable with said shell, said unit comprising, a pressure-receiving wedge element and two friction shoes, said wedge element and pressure-transmitting member having coacting flat faces disposed transversely of the mechanism, and said wedge element and one shoe having engaging faces extending at a relatively acute angle with respect to the line of the applied force, said wedge element and the other shoe having engaging faces extending at a relatively blunt angle with respect to the line of the applied force and said two shoes having engaging faces extending at a relatively blunt angle with respect to the line of the applied force.

4. In a friction shock absorbing mechanism, the combination with a friction shell having interior opposed friction surfaces extending in the general direction of the actuating force; of a spring resistance; a pressure-transmitting member; and a friction unit within and cooperable with said shell, said unit comprising, a pressure-receiving wedge element, and a plurality of friction-shoes cooperable with the shell friction surfaces, said pressure-receiving element and pressure-transmitting member having cooperating flat faces, and one shoe having a face extending inwardly of the shell at a relatively acute angle with respect to the axis thereof, another shoe having a face inclined inwardly of the shell at a relatively blunt angle with respect to the axis thereof, said wedge element having corresponding cooperating faces engaging said shoe faces, said shoe having said blunt angled face having also an additional face inclined in the opposite direction and cooperable with a corresponding face on another friction-shoe.

5. In a friction shock absorber mechanism, the combination with a friction shell having interior opposed friction surfaces extending in the general direction of the actuating force; of a spring resistance; a main follower; and a friction unit within and cooperable with said shell, said unit comprising, a friction-shoe having an outer friction surface cooperable with a shell surface and provided on its inner side with a laterally extending wedge section; an opposed friction-shoe having a lateral extension toward the first-named friction shoe, said lateral extension having an inclined face cooperable with one of the faces of said wedge section of the first named shoe; and a pressure-receiving wedge element actuated by said main follower and movable bodily therewith longitudinally of the mechanism, said element having relatively inwardly converged faces cooperable with corresponding faces on said friction-shoes.

6. In a friction shock absorbing mechanism, the combination with a friction shell having opposed interior friction surfaces, one of which extends parallel to the center line of the mechanism and the other at a relatively acute angle with respect to said center line; of a spring resistance; and a friction unit within and cooperating with the shell friction surfaces, said unit comprising, a pressure receiving wedge element and opposing friction-shoes, said wedge element and the shoe operating on said inclined surface of the shell having engaging faces extending at a blunt angle with respect to the axis of the shell, said pressure-receiving element and opposed shoe having engaging faces extending at a keen angle with respect to the axis of the shell.

7. In a friction shock absorbing mechanism, the combination with a friction shell having opposed interior friction surfaces, one of which extends parallel to the center line of the mechanism and the other at a relatively acute angle with respect to said center line; of a spring resistance; and a friction unit within and cooperating with the shell friction surfaces, said unit comprising, a pressure-receiving wedge element and opposing friction-shoes, said wedge element and the shoe operating on said inclined surface of the shell having engaging faces extending at a blunt angle with respect to the axis of the shell, said pressure-receiving element and opposed shoe having engaging faces extending at a keen angle with respect to the axis of the shell, said two shoes having also engaging faces inclined with the axis of the shell at the same angle as the inclination of the cooperating faces of the pressure element and the first named shoe, but in the opposite direction.

8. In a friction shock absorbing mechanism, the combination with a friction shell having opposed interior friction surfaces, one of which extends parallel to the center line of the mechanism and the other at a relatively acute angle with respect to said center line; of a spring resistance; and a friction unit within and cooperating with the shell friction surfaces, said unit comprising, a pressure-receiving wedge element and opposing friction shoes, said wedge element and one shoe having engaging faces extending at a blunt angle with respect to the axis of the shell, said pressure receiving element and opposed shoe having engaging faces extending at a keen angle with respect to the axis of the shell.

9. In a friction shock absorbing mechanism, the combination with a friction shell having interior opposed friction surfaces extending in the general direction of the actuating force; of a main follower; a spring resistance; and a friction unit within and cooperable with said shell, said unit comprising, a pressure-receiving wedge element and two friction-shoes, said wedge element having a transverse face bearing on said follower, said element and one shoe having engaging faces extending at a relatively acute angle with respect to the line of the applied force, said wedge element and the other shoe having engaging faces extending at a relatively blunt angle with respect to the line of the applied force and said two shoes having engaging faces extending at an angle with respect to the line of the applied force.

In witness that I claim the foregoing I have hereunto subscribed my name this 3rd day of February, 1923.

STACY B. HASELTINE.